(12) United States Patent
Giuseppin et al.

(10) Patent No.: US 11,467,837 B2
(45) Date of Patent: Oct. 11, 2022

(54) METHOD AND SYSTEM FOR PROTECTING AN AIRCRAFT AGAINST AN INCOHERENT COMMAND INSTRUCTION

(71) Applicant: Airbus Operations (S.A.S.), Toulouse (FR)

(72) Inventors: Marina Giuseppin, Toulouse (FR); Christophe Guillon, Muret (FR); Ewen Le Floch, Toulouse (FR); Lionel Afchard, Toulouse (FR); Jean Guilhamet, Fonsorbes (FR); Marie-Claire Pineri, Colomiers (FR); Stéphane Gauthier, Toulouse (FR); Jerome Treanton, Beauzelle (FR); Stéphane Bouchon, Toulouse (FR); Pierre Bizet, Seilh (FR); Sophie Royer, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 437 days.

(21) Appl. No.: 16/700,005

(22) Filed: Dec. 2, 2019

(65) Prior Publication Data
US 2020/0183692 A1    Jun. 11, 2020

(30) Foreign Application Priority Data

Dec. 4, 2018   (FR) ..................... 1872298

(51) Int. Cl.
*G06F 9/30* (2018.01)
*B64D 45/00* (2006.01)
(Continued)

(52) U.S. Cl.
CPC ..... *G06F 9/30145* (2013.01); *B64D 45/0015* (2013.01); *G06F 9/3836* (2013.01); *G06F 9/4843* (2013.01); *B64D 2045/0085* (2013.01)

(58) Field of Classification Search
CPC ........ B64D 2045/0085; B64D 45/0015; G06F 9/30145; G06F 9/3836; G06F 9/4843
See application file for complete search history.

(56) References Cited

U.S. PATENT DOCUMENTS

2003/0139135 A1    7/2003  Rossi
2007/0260775 A1*  11/2007  Bita ..................... G06F 3/0689
                                                      710/36
(Continued)

FOREIGN PATENT DOCUMENTS

EP          2 704 369 A1    3/2014

OTHER PUBLICATIONS

French Search Report for Application No. 1872298 dated Oct. 30, 2019.

*Primary Examiner* — Zachary K Huson
(74) *Attorney, Agent, or Firm* — Jenkins, Wilson, Taylor & Hunt, PA

(57) ABSTRACT

A method and system for protecting an aircraft against an incoherent command instruction. The system has a generation unit generating a command instruction transmitted to an evaluation unit that evaluates whether or not the command instruction is incoherent and generates and transmits a validation order if the command instruction is coherent or an arbitration request if not, the arbitration request being transmitted by an arbitration unit, where applicable, to an operator who sends a confirmation response or a cancellation response. The arbitration unit generates and transmits a validation order to an execution unit in the event of receiving a confirmation response and a cancellation order in the event of receiving a cancellation response, the system allowing the execution unit to execute only the command instructions evaluated and confirmed as not being incoherent.

16 Claims, 3 Drawing Sheets

(51) Int. Cl.
*G06F 9/38* (2018.01)
*G06F 9/48* (2006.01)

(56) References Cited

U.S. PATENT DOCUMENTS

| | | |
|---|---|---|
| 2009/0187976 A1 | 7/2009 | Perroud et al. |
| 2011/0276199 A1* | 11/2011 | Brot .................... G05D 1/0077 |
| | | 701/3 |
| 2014/0324520 A1 | 10/2014 | Fedosovskiy et al. |
| 2015/0378513 A1* | 12/2015 | Fontaine ............... G06F 3/0412 |
| | | 345/173 |
| 2017/0156674 A1* | 6/2017 | Hochman ............... G06F 3/015 |
| 2018/0275655 A1* | 9/2018 | Raynaud .............. G08G 5/0047 |
| 2019/0135435 A1* | 5/2019 | Dubrulle ................ G05D 1/101 |
| 2020/0156805 A1* | 5/2020 | Andrus .................. B64D 31/04 |

* cited by examiner

METHOD AND SYSTEM FOR PROTECTING AN AIRCRAFT AGAINST AN INCOHERENT COMMAND INSTRUCTION

CROSS-REFERENCE TO RELATED APPLICATION

This application claims priority to French patent application 18 72298 filed on Dec. 4, 2018, the entire disclosure of which is incorporated by reference herein.

TECHNICAL FIELD

The disclosure herein relates to a method and to a system for protecting an aircraft against an incoherent command instruction.

BACKGROUND

In order to control complex systems of an aircraft, in particular of a transport plane, the flight crew of the aircraft often use predetermined lists of commands (checklists). Such lists of commands comprise a sequence of commands (or procedures) comprising actions that the pilot has to perform, in particular by acting on actuation elements. In the context of the disclosure herein, "actuation element" is understood to mean any unit, button, lever or control or any tactile element present on the aircraft and able to be actuated (touched, pressed, pulled, etc.) by a pilot of the aircraft in order to command the implementation of a particular action.

On commercial transport planes piloted by at least two pilots, in order to implement such a list of commands, in general, one of the pilots, specifically the pilot PM (for pilot monitoring) who is monitoring the flight, progressively reads through the various commands (or procedural steps) in the list of commands, and the other pilot, specifically the pilot PF (for pilot flying) who is piloting the aircraft, performs the actions required for each of these commands or procedural steps. The pilot PM who reads the actions at the same time monitors the actions performed by the pilot PF, and thus makes it possible to prevent actuation errors such as actuating an incorrect system not involved in the current procedure or an incoherent command or positioning of a correct actuation element.

In spite of this check by the pilot PM, actuation errors and/or malfunctions of the control elements are not ruled out.

In addition, centralized systems on board aircraft may automatically send configuration or reconfiguration command instructions to other systems of the aircraft. Incoherent behaviour of these centralized systems could in particular lead to an incorrect reconfiguration of the other systems of the aircraft.

There are specialist monitoring devices for monitoring actions of a pilot. These devices generally emit a warning before the command instruction is generated, but are not able to prevent execution thereof.

Despite these monitoring devices, actuation errors by a pilot, malfunctions of a control element or even incoherent behaviour of the centralized systems may lead to the execution of one or more incorrect command instructions. This solution is therefore not entirely satisfactory.

SUMMARY

The aim of the disclosure herein is to rectify this drawback.

To this end, it relates to a method for protecting an aircraft against an incoherent command instruction.

According to the disclosure herein, the method comprising a generation step, implemented by a generation unit, consisting in or comprising generating a command instruction, additionally comprises the sequence of following steps:

a first transmission step, implemented by a first transmission link, consisting in or comprising transmitting the command instruction generated by the generation unit to an evaluation unit;

an evaluation step, implemented by the evaluation unit, consisting in or comprising evaluating whether or not the command instruction is incoherent and in generating and transmitting an arbitration request if the command instruction is incoherent and a first command instruction validation order if not;

an arbitration step, implemented by an arbitration unit, consisting of or comprising:

transmitting, where applicable, the arbitration request received from the evaluation unit to an operator by way of a communication system;

receiving a confirmation response or a cancellation response from the operator by way of the communication system; and generating and transmitting a second command instruction validation order to an execution unit in the event of receiving a confirmation response and a command instruction cancellation order in the event of receiving a cancellation response; and an execution step, implemented by the execution unit, consisting in or comprising executing the command instruction in the event of receiving a first or a second command instruction validation order.

A command instruction is thus evaluated by virtue of the disclosure herein. If the command instruction is evaluated as being incoherent, arbitration is performed, during which an operator has to confirm or cancel this incoherent command instruction before execution thereof. An incoherent command instruction is understood to mean a command instruction whose execution results in the aircraft being placed in danger. Therefore, only command instructions whose execution does not present any danger for the aircraft are executed.

Advantageously, in a first embodiment, the evaluation step comprises the sequence of following sub-steps:

an acquisition sub-step, implemented by an acquisition module, consisting in or comprising acquiring parameter data of the aircraft, the acquired data defining a current state of the aircraft;

a selection sub-step, implemented by a selection module, consisting in or comprising selecting a list from among a plurality of lists in a database, each of the lists being associated with the execution of a particular command instruction and comprising a set of predetermined states and technical consequences if the particular command instruction is executed, the selected list being associated with the execution of the command instruction received from the generation unit;

a checking sub-step, implemented by a checking module, consisting in or comprising checking a lack of conformity or conformity of the current state with a predetermined state defined for the selected list, the conformity of the current state with the predetermined state being representative of an incoherent command instruction;

a generation sub-step, implemented by a generation module, consisting in or comprising:

generating an arbitration request if the command instruction is incoherent; and generating the first command instruction validation order if not.

Furthermore, in a second embodiment, the evaluation step comprises:

an acquisition sub-step, implemented by an acquisition module, consisting in or comprising acquiring parameter data of the aircraft;

a modelling sub-step, implemented by a modelling module, consisting in or comprising modelling a state of the aircraft and a protective envelope around the state of the aircraft, based on the acquired parameter data, the protective envelope surrounding the state of the aircraft representing the modelled state of the aircraft;

a simulation sub-step, implemented by a simulation module, consisting in or comprising simulating a state of the aircraft if a particular command instruction is executed; and a decision sub-step, implemented by a decision module, consisting in or comprising comparing at least one value of parameters defining the modelled state and at least one value of parameters defining the simulated state, in deducing the coherence or incoherence of the command instruction therefrom according to predetermined rules, and then in generating the first validation order if the command instruction is coherent or an arbitration request if the command instruction is incoherent.

Moreover, advantageously, the evaluation step also comprises a warning sub-step, consisting in or comprising sending a warning signal, in the event that the evaluation unit is incapable of evaluating the command instruction.

Moreover, advantageously, the arbitration request comprises at least the following information:

a command instruction to be arbitrated;

the identity of the generation unit that generated the command instruction;

at least one technical consequence in the event that the command instruction is executed;

a request to confirm or to cancel the command instruction.

Furthermore, advantageously, the method also comprises a second transmission step, implemented by a second transmission link, consisting in or comprising transmitting the command instruction generated by the generation unit to the execution unit.

In a first embodiment, the first transmission step and the second transmission step are implemented simultaneously.

In a second embodiment, the second transmission step is implemented only if the evaluation unit generates the first command instruction validation order or if the arbitration unit generates the second command instruction validation order.

Advantageously, the execution step also consists in or comprises executing the command instruction received from the generation unit in the event of receiving a warning signal sent by the evaluation unit and in the event of a lack of reception, within a predetermined time interval, of a first command instruction validation order, of a second command instruction validation order and of a command instruction cancellation order.

The disclosure herein also relates to a system for protecting an aircraft against an incoherent command instruction.

According to the disclosure herein, the system having a generation unit, configured so as to generate a command instruction, also has:

a first transmission link configured so as to transmit the command instruction generated by the generation unit to an evaluation unit;

the evaluation unit, configured so as to evaluate whether or not the command instruction is incoherent and to generate and transmit an arbitration request if the command instruction is incoherent and a first command instruction validation order if not;

an arbitration unit configured so as:

to transmit, where applicable, the arbitration request received from the evaluation unit to an operator by way of a communication system;

to receive a confirmation response or a cancellation response from the operator by way of the communication system; and to generate and to transmit a second command instruction validation order to an execution unit in the event of receiving a confirmation response and a command instruction cancellation order in the event of receiving a cancellation response; and the execution unit, configured so as to execute the command instruction in the event of receiving a first or a second command instruction validation order.

Advantageously, in a first embodiment, the evaluation unit has:

a database comprising a plurality of lists, each of the lists being associated with the execution of a particular command instruction and comprising a set of predetermined states and technical consequences if the particular command instruction is executed;

an acquisition module configured so as to acquire parameter data of the aircraft, the acquired data defining a current state of the aircraft;

a selection module configured so as to select a list from among the plurality of lists in the database, the selected list being associated with the execution of the command instruction received from the generation unit;

a checking module configured so as to check a lack of conformity or conformity of the current state with a predetermined state defined for the selected list, the conformity of the current state with the predetermined state being representative of an incoherent command instruction;

a generation module configured so as to:

generate an arbitration request if the command instruction is incoherent; and generate the first command instruction validation order if not.

Advantageously, in a second embodiment, the evaluation unit has:

an acquisition module configured so as to acquire parameter data of the aircraft;

a modelling module configured so as to model a state of the aircraft and a protective envelope around the state of the aircraft, based on the acquired parameter data, the protective envelope surrounding the state of the aircraft representing the modelled state of the aircraft;

a simulation module, configured so as to simulate a state of the aircraft if a particular command instruction is executed; and a decision module, configured so as to compare at least one value of parameters defining the modelled state and at least one value of parameters defining the simulated state, to deduce the coherence or incoherence of the command instruction therefrom according to predetermined rules, and then to generate the first validation order if the command instruction is coherent or an arbitration request if the command instruction is incoherent.

Moreover, advantageously, the system also has a second transmission link, configured so as to transmit the command instruction generated by the generation unit to the execution unit.

Moreover, preferably, the evaluation unit is also configured so as to send a warning signal, in the event that the evaluation unit is incapable of evaluating the command instruction.

Furthermore, advantageously, the execution unit is also configured so as to execute the command instruction received from the generation unit in the event of receiving a warning signal sent by the evaluation unit and in the event of a lack of reception, within a predetermined time interval, of a first command instruction validation order, of a second command instruction validation order or of a command instruction cancellation order.

The disclosure herein additionally relates to an aircraft, in particular a transport plane, comprising a system for protecting against an incoherent command instruction for an aircraft such as the one specified above.

BRIEF DESCRIPTION OF THE FIGURES

The appended figures will make it easy to understand how the disclosure herein may be implemented. In these example figures, identical references denote similar elements.

DETAILED DESCRIPTION

Figure 1:
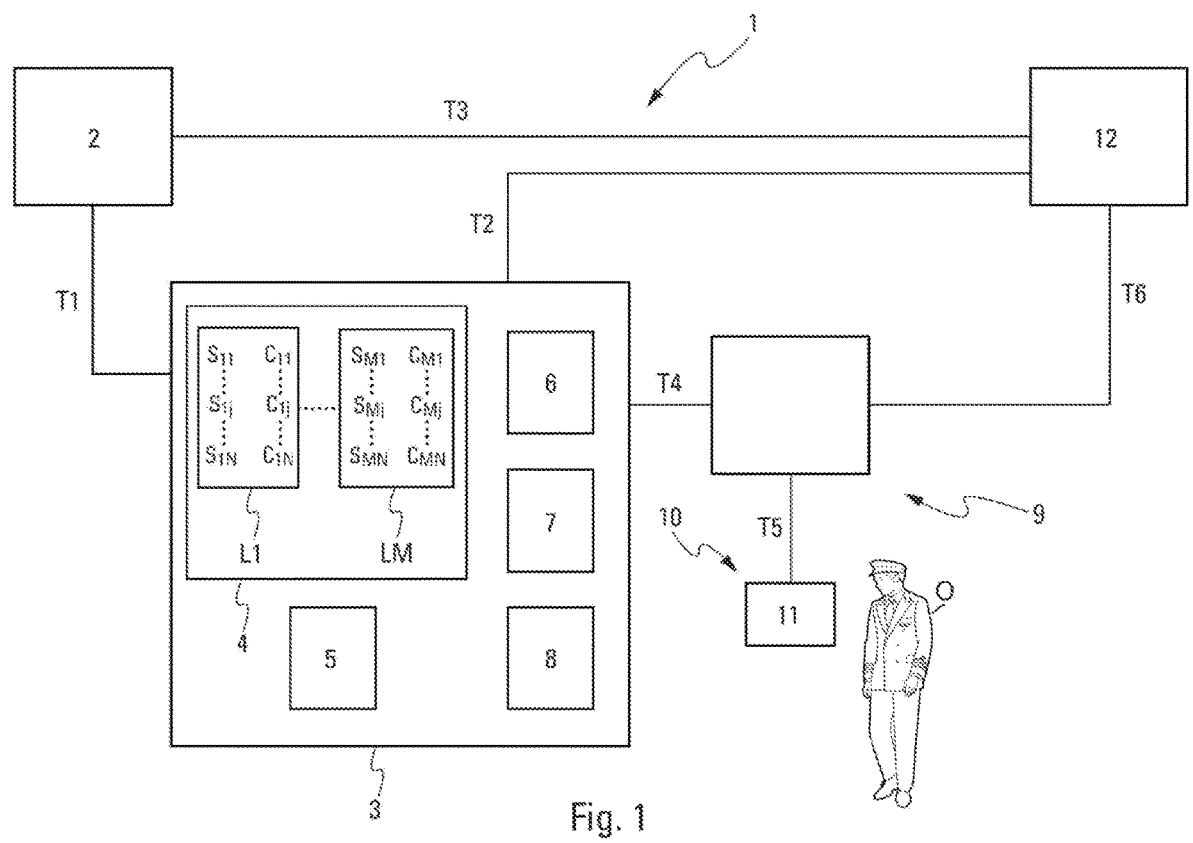
FIG. 1 is a synoptic diagram of one particular embodiment of a system for protecting an aircraft against an incoherent command instruction.
Figure 3:
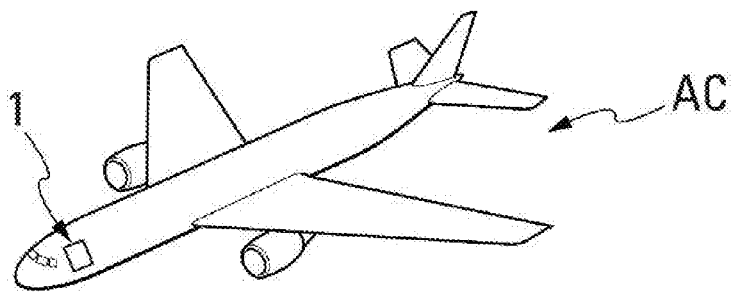
FIG. 3 shows an aircraft with an on-board system for protecting an aircraft against an incoherent command instruction.

The protection system 1 (hereinafter "system 1"), shown schematically in one particular embodiment in FIG. 1, is intended to protect an aircraft AC, in particular a transport plane, on which it is installed (FIG. 3) against an incoherent command instruction.

In the context of the disclosure herein, an incoherent command instruction is understood to mean any command instruction whose execution may lead to a drop in the performance and/or capabilities of the aircraft AC, or even generate a situation deemed to be dangerous for the aircraft AC. By analogy, a coherent command instruction is a command instruction whose execution does not lead to any drop in performance and/or capabilities of the aircraft AC, or to situations deemed to be dangerous for the aircraft AC.

As shown in FIG. 1, the system 1 comprises at least one generation unit 2 that is able to generate a command instruction.

In one preferred embodiment, the generation unit 2 is a control that is able to be actuated (touched, pressed, pulled, etc.) by one of the pilots of the aircraft AC. In one particular implementation of this embodiment, this control is a button (rotary button, pushbutton, etc.), a unit or a lever. In another implementation of this embodiment, the control is a human-machine interface system. Such a human-machine interface system may comprise a function for viewing and monitoring the avionic systems generating a command instruction based on at least one action of one of the pilots on a tactile element (touchscreen, tactile controller, etc.). Moreover, the actuation of the human-machine interface system may also be voice-based or gesture-based.

In another embodiment, the generation unit 2 is a system for automatically managing the configuration and/or reconfiguration of avionic systems. By way of example, an automatic management system may be an FWS (flight warning system) system configured so as to send configuration and reconfiguration command instructions to the other avionic systems of the aircraft.

A command instruction therefore results from the actuation of a control by one of the pilots or of an automatic management system of the aircraft AC. It relates to the configuration and reconfiguration of one or more avionic systems. An avionic system is generally a system on board the aircraft AC, such as an engine management system, an electrical system, etc.

Moreover, each command instruction generated by the generation unit 2 is transmitted to an evaluation unit 3 by way of a transmission link T1.

Furthermore, each command instruction generated by the generation unit 2 is also transmitted to an execution unit 12 by way of a transmission link T2.

The evaluation unit 3 preferably evaluates whether or not the received command instruction is incoherent. The evaluation unit 3 generates and transmits an arbitration request R if the command instruction is evaluated as being incoherent and a command instruction validation order V1 if not, that is to say if the command instruction is evaluated as being coherent.

In one preferred embodiment, the evaluation unit 3 has a database 4. This database 4 comprises a plurality of lists Li, where i=1, ..., M, M being an integer. Each list Li in the database 4 is associated with the execution of a particular command instruction that is able to be generated by the generation unit 2. A list Li associated with the execution of a particular command instruction comprises a sequence of predetermined states $S_{ij}$ and of technical consequences $C_{ij}$ relating to each predetermined state $S_{ij}$, where j=1, ..., N, N being an integer. The total number of predetermined states $S_{ij}$ and of technical consequences $C_{ij}$ may be different from one list to another.

By way of example, a command instruction may be an instruction asking to "Turn off the engine 2" in the case of an aircraft AC comprising two engines, the engine 1 possibly being on fire. In this example, predetermined states $S_{ij}$ defined for a list Li associated with this command instruction may be "Engine 1 on fire and Aircraft flying", "Thrust of the engine 1 degraded and Aircraft in take-off phase", etc.

Each technical consequence $C_{ij}$ is representative of a result, on the execution units 12, if the aircraft AC is in the predetermined state $S_{ij}$ defined for the list Li and the particular command instruction is executed. The technical consequences $C_{ij}$ are often deemed to be dangerous. They lead to a loss of performance and/or capabilities of the aircraft AC that is dangerous for the aircraft AC.

The technical consequences $C_{ij}$ associated with the predetermined states $S_{ij}$ set out in the example above if the command instruction is "Turn off the engine 2" may comprise "Total loss of thrust", "Risk of loss of enough thrust to avoid surrounding obstacles", etc.

The evaluation unit 3 also has an acquisition module 5 that acquires (current) parameter data of the aircraft AC. The acquisition module 5 preferably comprises a set of sensors and avionic systems able to supply data in relation to the command instruction received by the evaluation unit 3. The (current) parameter data of the aircraft AC are for example altitude values, velocity values, the state of an engine, etc. These (current) parameter data define what is called a current state of the aircraft AC.

In the preferred embodiment, the evaluation unit 3 comprises a selection module 6 that selects the list $L_k$, from among the plurality of lists $L_1$ to $L_M$ in the database 4, that is associated with the execution of the command instruction generated by the generation unit 2.

The evaluation unit 3 additionally comprises a checking module 7 that checks whether the current state of the aircraft AC defined by the acquisition module 5 matches or does not match one of the predetermined states $S_{kl}$ in the selected list $L_k$, l ranging from 1 to N.

A current state matching a predetermined state $S_{kl}$ defined for the list $L_k$ means that the command instruction is incoherent. Execution thereof may lead to technical consequences $C_{kl}$ corresponding to the predetermined state $S_{kl}$ matching the current state of the aircraft AC. These technical consequences $C_{ij}$ are deemed to be dangerous for the aircraft AC.

By contrast, a current state that does not match a predetermined state $S_{kl}$ defined for the list $L_k$ means that the command instruction is coherent. Execution thereof does not lead to technical consequences that may be dangerous for the aircraft AC.

The evaluation unit 3 furthermore has a generation module 8 that:
  generates an arbitration request R if the command instruction is evaluated as being incoherent by the checking module 7; and
  generates the command instruction validation order V1 if not.

Figure 2:
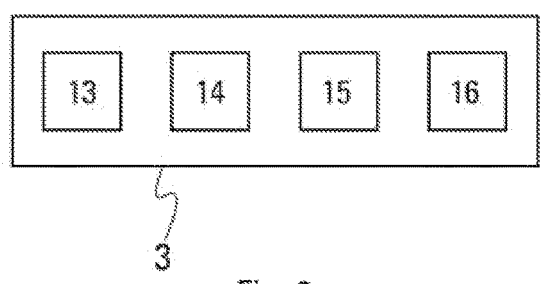
FIG. 2 is a synoptic diagram of one particular implementation of an evaluation unit of a system for protecting an aircraft against an incoherent instruction.

In another embodiment, the evaluation unit 3 comprises, as shown in FIG. 2:
  an acquisition module 13 that is identical for example to the acquisition module 5 and that acquires parameter data of the aircraft AC;
  a modelling module 14 that models a state of the aircraft AC and a protective envelope around the state of the aircraft AC, based on the acquired parameter data, the protective envelope surrounding the state of the aircraft AC representing the modelled state of the aircraft. The state of the aircraft AC is represented for example by Petri nets each node of which is an execution unit 12 and each link of which is an interaction between the execution units 12;
  a simulation module 15 that is able to simulate a state of the aircraft AC if a particular command instruction is executed; and
  a decision module 16 that compares at least one value of parameters defining the modelled state and at least one value of parameters defining the simulated state, and deduces the coherence or incoherence of the command instruction therefrom according to predetermined rules, and then generates the validation order V1 if the command instruction is coherent or an arbitration request R if the command instruction is incoherent.

Predetermined rules are understood to mean a set of rules for determining whether or not the execution of a command instruction causes one of the parameters defining the simulated state to stray in comparison with the protective envelope defining the modelled state of the aircraft AC. The protective envelope represents maximum permissible values for the parameter values of the simulated state of the aircraft AC.

The validation order V1, generated by the evaluation unit 3 in the first or the second embodiment, is transmitted to an execution unit 12 by way of a transmission link T3 shown in FIG. 1. The arbitration request R is transmitted to an arbitration unit 9 by way of a transmission link T4 that is also shown in FIG. 1.

In one particular embodiment, the evaluation unit 3 is configured so as to send a warning signal in the event that the evaluation unit 3 is incapable of evaluating the command instruction.

In one preferred embodiment, the arbitration unit 9 is a human-machine interface hosted by a human-machine interface system. In one particular embodiment, the arbitration unit 9 is hosted by the same human-machine interface system as the generation unit 2.

Moreover, the arbitration unit 9 transmits the arbitration request R, received from the evaluation unit 3 in the event that the command instruction is incoherent, to a communication system 10, which communicates it to an operator O.

The communication system 10 comprises a transmission link T5 and a communication device 11, for example a display screen that may be a touchscreen, a camera or a microphone. The communication system 10 sends the arbitration request R to the communication device 11, which displays it on the screen or which emits it in voice form to the operator O.

In one preferred embodiment, the operator O is one of the pilots who has actuated the generation unit 2 or any other member of the flight crew. In this preferred embodiment, the communication device 11 is arranged in the cockpit and the data link is wired or wireless T5. In one variant (not shown), the operator O is a person who is not present in the aircraft AC. The communication device 11 is arranged outside of the aircraft AC, for example in the airline operations centre, or is portable. In this variant embodiment, the data link T5 is a wireless link.

The communication system 10 is also configured so as to receive a response from the operator O. This is either a response confirming the command instruction or a response cancelling the command instruction. The operator O acts on the communication device 11 in order to send his response. As shown in FIG. 1, the arbitration unit 9 transmits a validation order V2 if the response from the operator O is a confirmation response, and a cancellation order A if the response from the operator O is a cancellation response. The arbitration unit 9 transmits either the validation order V2 or the cancellation order A to the execution unit 12 by way of a transmission link T6.

The execution unit 12 furthermore represents one or more avionic systems. This avionic system or these avionic systems is or are on-board systems, for example an engine management system, an electrical system, etc. The execution unit 12 executes the command instruction received from the generation unit 2 if a validation order V1, V2 has been transmitted thereto either by the evaluation unit 3 or by the arbitration unit 9. If the arbitration unit 9 transmits a cancellation order A thereto, the execution unit 12 does not execute the command instruction.

In one particular embodiment, the execution unit 12 is also configured so as to execute the command instruction if, after a predetermined time interval, no command instruction validation order V1, V2 or no command instruction cancellation order A has been transmitted thereto. The predetermined time interval starts when the execution unit 12 receives the command instruction generated by the generation unit 2. In one variant, the execution unit 12 is also configured so as to ignore the command instruction if, after a predetermined time interval, no command instruction validation order V1, V2 or no command instruction cancellation order A has been transmitted thereto. By way of example, the predetermined time interval lasts three minutes.

In one variant, the execution unit 12 executes the command instruction if the execution unit 12 receives the warning signal sent by the evaluation unit 3. This warning signal informs the execution unit 12 that the evaluation unit 3 is faulty and is not able to evaluate the command instruction.

Figure 4A:
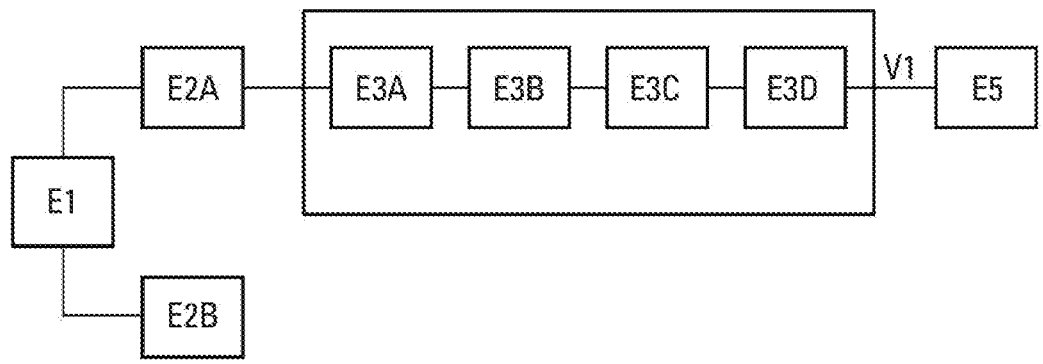
FIG. 4A illustrates a first particular implementation of an embodiment of a method for protecting against an incoherent command instruction.
Figure 4B:
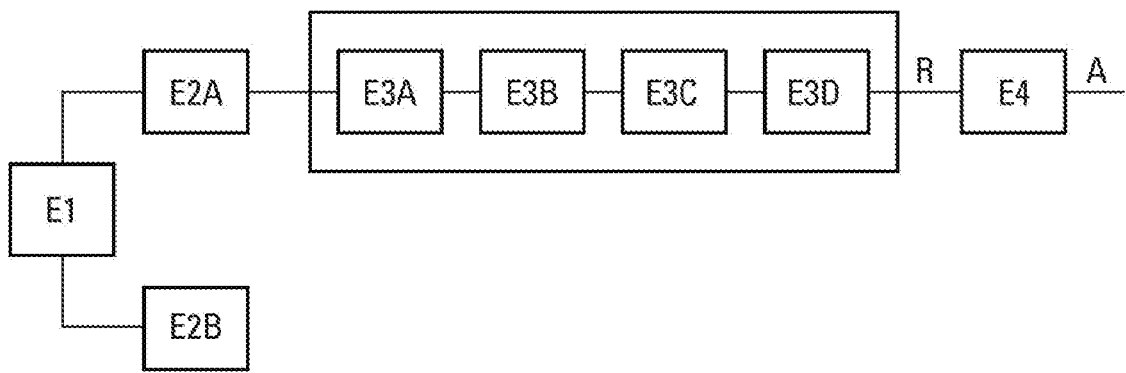
FIG. 4B illustrates a second particular implementation of an embodiment of a method for protecting against an incoherent command instruction.
Figure 4C:
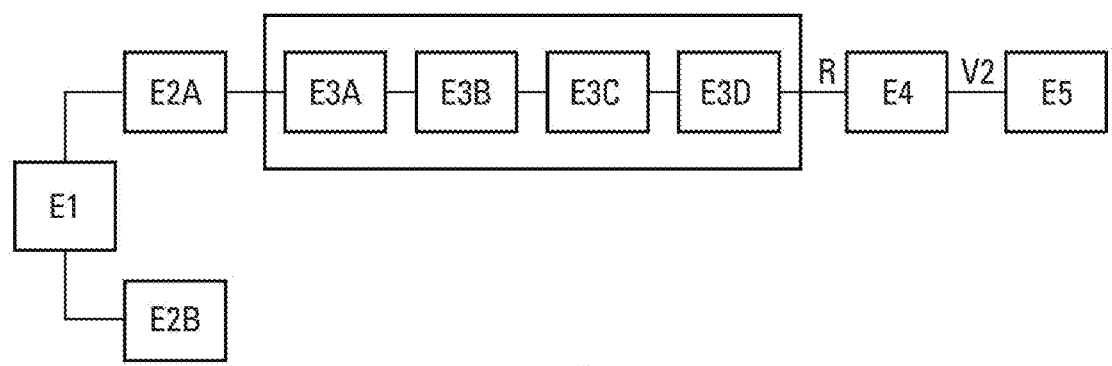
FIG. 4C illustrates a third particular implementation of an embodiment of a method for protecting against an incoherent command instruction.

The system 1 as described above is able to implement a method for protecting the performance and/or capabilities of an aircraft AC on which it is installed against an incoherent command instruction. The method comprises several particular implementations, as shown in FIGS. 4A, 4B and 4C.

The method comprises a generation step E1, implemented by the generation unit 2, consisting in or comprising generating a command instruction, either automatically by way of an automatic management system or following the actuation of a control by a pilot. The generated command instruction is then transmitted to the evaluation unit 3 in a first transmission step E2A.

In order to evaluate whether the command instruction is incoherent or is not incoherent, the method comprises an evaluation step E3 containing the sequence of following sub-steps E3A, E3B, E3C and E3D.

In the acquisition sub-step E3A, sensors and/or avionic systems that form part of the acquisition module 5 acquire a plurality of parameter data of the aircraft AC. This set of parameter data defines a current state of the aircraft AC. By way of example, one of the engines of the aircraft is on fire during a flight. A current state of the aircraft AC is "Engine 1 on fire, aircraft AC flying".

In parallel, the selection sub-step E3B makes it possible to select the list Lk associated with the execution of the command instruction generated by the generation unit 2 from among the lists L1 to LM in the database 4. The selected list Lk comprises predetermined states Skl and technical consequences Ckl relating to these predetermined states Skl if the generated command instruction is executed. The predetermined states Skl defined for the list Lk form a non-exhaustive set of situations in which executing the command instruction leads to a loss of performance and/or capabilities of the aircraft AC. The technical consequences Ckl relating to these predetermined states Skl form a set of additional information about this loss of performance and/or capabilities of the aircraft AC that may lead to the aircraft being placed in danger.

When the list Lk is selected, the current state of the aircraft AC is compared to each of the predetermined states Skl defined for the selected list Lk. The checking sub-step E3C, following the sub-steps E3A and E3B, checks whether the current state matches or does not match one of the predetermined states Skl.

As shown in FIG. 4A, if the current state does not match, that is to say if the current state does not correspond to any of the predetermined states Skl defined for the list Lk, the command instruction received from the generation unit 2 is evaluated by the checking module 7 as being coherent. A validation order V1 is then generated by the generation module 8 in the generation sub-step E3D and transmitted to the execution unit 12.

By contrast, if the current state of the aircraft AC matches one of the predetermined states Skl, that is to say if the current state corresponds to at least one of the predetermined states Skl defined for the selected list Lk, the command instruction is evaluated as being incoherent by the checking module 7. As shown in FIGS. 4B and 4C, the generation sub-step E3D then consists in or comprises generating an arbitration request R that is transmitted to the arbitration unit 9.

In one variant, the evaluation step E3 comprises:
- an acquisition sub-step, identical for example to the acquisition sub-step E3A, implemented by the acquisition module 13, consisting in or comprising acquiring parameter data of the aircraft AC;
- a modelling sub-step, implemented by the modelling module 14 and consisting in or comprising modelling a state of the aircraft AC and a protective envelope around the state of the aircraft AC, based on the acquired parameter data, the protective envelope surrounding the state of the aircraft AC representing the modelled state of the aircraft. The state of the aircraft AC is represented for example by Petri nets each node of which is an execution unit 12 and each link of which is an interaction between the execution units 12;
- a simulation sub-step, implemented by a simulation module 15, consisting in or comprising or comprising simulating a state of the aircraft AC if a particular command instruction is executed; and
- a decision sub-step, implemented by a decision module 16, consisting in or comprising comparing at least one value of parameters defining the modelled state and at least one value of parameters defining the simulated state, in deducing the coherence or incoherence of the command instruction therefrom according to predetermined rules, and then in generating the first validation order V1 if the command instruction is coherent or an arbitration request R if the command instruction is incoherent.

The arbitration request R preferably comprises at least the following information:
- the command instruction to be arbitrated;
- the identity of the generation unit 2 that generated the command instruction;
- at least one technical consequence Cij in the event that the command instruction is executed; and
- a request to confirm or to cancel the command instruction.

By way of example, an arbitration request R may be "Command to turn off the engine 2 requested. Engine 1 on fire. Total loss of thrust if confirmed.".

In an arbitration step E4, the arbitration request R is transmitted to the operator O by way of the communication system 10. The arbitration request R may be displayed on a display screen, be uttered in voice form, etc. The operator O responds to the arbitration request R by sending a response confirming the command instruction or by contrast a response cancelling the command instruction. The response from the operator O may be in the form of gestures in front of a camera, via a screen that may be a touchscreen, voice-based via a microphone, etc. depending on the communication device 11.

As shown in FIG. 4B, if the operator O sends a cancellation response, the arbitration unit 9 transmits a cancellation order A to the execution unit 12 by way of the communication device 11. The command instruction is cancelled and is not executed in the execution step E5.

By contrast, if the operator O sends a confirmation response to the communication device 11 of the arbitration unit 9, as shown in FIG. 4C, the arbitration unit 9 transmits a validation order V2 to the execution unit 12. The command instruction is then executed in the execution step E5.

In one preferred embodiment, the generation unit 2 transmits the command instruction simultaneously to the evaluation unit 3 and to the execution unit 12 in transmission steps E2A and E2B respectively (shown in FIGS. 4A, 4B and 4C). The execution unit 12 then executes the command instruction in an execution step E5 as soon as a validation order V1, V2 is received.

In one variant that is not shown, the step E2B of transmitting the command instruction from the generation unit 2 to the execution unit 12 takes place only if the evaluation unit 3 or the arbitration unit 9 has generated a validation order V1, V2 relating to the command instruction.

In another variant that is not shown, the evaluation unit 3 continuously evaluates whether a command instruction received from the generation unit 2 is coherent or is incoherent. The evaluation unit 3 generates a pre-validation order for each coherent command instruction in the current context. The command instructions sent by the generation unit 2 and pre-validated by the validation unit 3 are then transmitted immediately to the execution unit 12. The execution unit 12 executes them.

Moreover, in one particular embodiment that is not shown, the command instruction is executed in the execution step E5 if no validation order V1, V2 or cancellation order A is transmitted to the execution unit 12 by the end of a predetermined time interval. This predetermined time interval, which starts when the execution unit 12 receives the command instruction, may last three minutes.

In one variant that is not shown, the command instruction is executed in the execution step E5 if the execution unit 12 receives a warning signal sent by the evaluation unit 3. This warning signal informs the execution unit 12 that the evaluation unit 3 is faulty and is not able to evaluate the command instruction.

The system 1 thus makes it possible to protect the execution unit 12 from an incoherent command instruction that, if it were to be executed, would risk damaging the configuration or reconfiguration of the avionic systems. Such damage would lead to a loss of performance and/or capabilities of the aircraft AC, or even place the aircraft AC in danger.

Advantageously, the system 1 makes it possible to protect the aircraft AC against, inter alia:
- untimely or incoherent actuations of certain control by the flight crew;
- incoherent operation of a human-machine interface system, for example generating and transmitting a command instruction without an action from the flight crew; and
- incoherent operation of a system for automatically managing the configuration and reconfiguration of avionic systems.

In addition, the system 1 is robust to any faults with or incoherent operation of the evaluation unit 3.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for protecting an aircraft against an incoherent command instruction, the method comprising a generation step, implemented by a generation unit, comprising generating a command instruction, the method comprising a sequence of following steps:
- a first transmission step, implemented by a first transmission link, comprising transmitting the command instruction generated by the generation unit to an evaluation unit;
- an evaluation step, implemented by the evaluation unit, comprising evaluating whether or not the command instruction is incoherent and in generating and transmitting an arbitration request if the command instruction is incoherent and a first command instruction validation order if not;
- an arbitration step, implemented by an arbitration unit, comprising:
  - transmitting, where applicable, the arbitration request received from the evaluation unit to an operator by a communication system;
  - receiving a confirmation response or a cancellation response from the operator by the communication system; and
  - generating and transmitting a second command instruction validation order to an execution unit in an event of receiving a confirmation response and a command instruction cancellation order in an event of receiving a cancellation response; and
- an execution step, implemented by the execution unit, comprising executing the command instruction in an event of receiving a first or a second command instruction validation order.

2. The method according to claim 1,
wherein the evaluation step comprises a sequence of following sub-steps:
   an acquisition sub-step, implemented by an acquisition module, comprising acquiring parameter data of the aircraft, the acquired data defining a current state of the aircraft;
   a selection sub-step, implemented by a selection module, comprising selecting a list from among a plurality of lists in a database, each of the lists being associated with execution of a particular command instruction and comprising a set of predetermined states and technical consequences if the particular command instruction is executed, the selected list being associated with execution of the command instruction received from the generation unit;
   a checking sub-step, implemented by a checking module, comprising checking a lack of conformity or conformity of the current state with a predetermined state defined for the selected list, the conformity of the current state with the predetermined state being representative of an incoherent command instruction;
   a generation sub-step, implemented by a generation module, comprising:
      generating an arbitration request if the command instruction is incoherent; and
      generating the first command instruction validation order if not.

3. The method according to claim 1,
wherein the evaluation step comprises:
   an acquisition sub-step, implemented by an acquisition module, comprising acquiring parameter data of the aircraft;
   a modelling sub-step, implemented by a modelling module, comprising modelling a state of the aircraft and a protective envelope around the state of the aircraft, based on the acquired parameter data, the protective envelope surrounding the state of the aircraft representing the modelled state of the aircraft;
   a simulation sub-step, implemented by a simulation module, comprising simulating a state of the aircraft if a particular command instruction is executed; and
   a decision sub-step, implemented by a decision module, comprising comparing at least one value of parameters defining the modelled state and at least one value of parameters defining the simulated state, in deducing coherence or incoherence of the command instruction therefrom according to predetermined rules, and then in generating the first validation order if the command instruction is coherent or an arbitration request if the command instruction is incoherent.

4. The method according to claim 1, wherein the evaluation step also comprises a warning sub-step, comprising sending a warning signal, in an event that the evaluation unit is incapable of evaluating the command instruction.

5. The method according to claim 1,
wherein the arbitration request comprises at least the following information:
   a command instruction to be arbitrated;
   identity of the generation unit that generated the command instruction;
   at least one technical consequence in an event that the command instruction is executed;
   a request to confirm or to cancel the command instruction.

6. The method according to claim 1, comprising a second transmission step, implemented by a second transmission link, comprising transmitting the command instruction generated by the generation unit to the execution unit.

7. The method according to claim 6, wherein the first transmission step and the second transmission step are implemented simultaneously.

8. The method according to claim 6, wherein the second transmission step is implemented only if the evaluation unit generates the first command instruction validation order or if the arbitration unit generates the second command instruction validation order.

9. The method according to claim 1, wherein the execution step also comprises executing the command instruction received from the generation unit in an event of receiving a warning signal sent by the evaluation unit and in an event of a lack of reception, within a predetermined time interval, of a first command instruction validation order, of a second command instruction validation order and of a command instruction cancellation order.

10. A system for protecting an aircraft against an incoherent command instruction, the system having a generation unit configured to generate a command instruction,
the system comprising:
   a first transmission link configured to transmit the command instruction generated by the generation unit to an evaluation unit;
   the evaluation unit configured to evaluate whether or not the command instruction is incoherent and to generate and transmit an arbitration request if the command instruction is incoherent and a first command instruction validation order if not;
   an arbitration unit configured to:
      transmit, where applicable, the arbitration request received from the evaluation unit to an operator by way of a communication system;
      receive a confirmation response or a cancellation response from the operator by way of the communication system; and
      to generate and to transmit a second command instruction validation order to an execution unit in the event of receiving a confirmation response and a command instruction cancellation order in an event of receiving a cancellation response; and
   the execution unit, configured to execute the command instruction in an event of receiving a first or a second command instruction validation order.

11. The system according to claim 10,
wherein the evaluation unit comprises:
   a database comprising a plurality of lists, each of the lists being associated with execution of a particular command instruction and comprising a set of predetermined states and technical consequences if the particular command instruction is executed;
   an acquisition module configured to acquire parameter data of the aircraft, the acquired data defining a current state of the aircraft;
   a selection module configured to select a list from among the plurality of lists in the database, the selected list being associated with execution of the command instruction received from the generation unit;
   a checking module configured to check a lack of conformity or conformity of the current state with a predetermined state defined for the selected list, the conformity of the current state with the predetermined state being representative of an incoherent command instruction;
a generation module configured to:
generate an arbitration request if the command instruction is incoherent; and
generate the first command instruction validation order if not.

12. The system according to claim 10, wherein the evaluation unit comprises:
an acquisition module configured to acquire parameter data of the aircraft;
a modelling module configured to model a state of the aircraft and a protective envelope around the state of the aircraft, based on the acquired parameter data, the protective envelope surrounding the state of the aircraft representing the modelled state of the aircraft;
a simulation module, configured to simulate a state of the aircraft if a particular command instruction is executed; and
a decision module, configured to compare at least one value of parameters defining the modelled state and at least one value of parameters defining the simulated state, to deduce the coherence or incoherence of the command instruction therefrom according to predetermined rules, and then to generate the first validation order if the command instruction is coherent or an arbitration request if the command instruction is incoherent.

13. The system according to claim 10, comprising a second transmission link, configured to transmit the command instruction generated by the generation unit to the execution unit.

14. The system according to claim 10, wherein the evaluation unit is also configured to send a warning signal, in an event of incapability of evaluating the command instruction.

15. The system according to claim 10, wherein the execution unit is also configured to execute the command instruction received from the generation unit in an event of receiving a warning signal sent by the evaluation unit and in the event of a lack of reception, within a predetermined time interval, of a first command instruction validation order, of a second command instruction validation order or of a command instruction cancellation order.

16. An aircraft comprising a system according to claim 10 for protecting the aircraft against an incoherent command instruction.

* * * * *